(12) United States Patent
Xu et al.

(10) Patent No.: US 8,235,309 B2
(45) Date of Patent: Aug. 7, 2012

(54) ADVANCED HIGH PERFORMANCE HORIZONTAL PIEZOELECTRIC HYBRID SYNTHETIC JET ACTUATOR

(75) Inventors: Tian-Bing Xu, Hampton, VA (US); Xiaoning Jiang, State College, PA (US); Ji Su, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 804 days.

(21) Appl. No.: 12/355,782

(22) Filed: Jan. 18, 2009

(65) Prior Publication Data

US 2010/0045752 A1 Feb. 25, 2010

Related U.S. Application Data

(60) Provisional application No. 61/091,512, filed on Aug. 25, 2008.

(51) Int. Cl.
*B05B 1/08* (2006.01)
(52) U.S. Cl. .................. 239/102.2; 239/102.1; 239/589; 239/601; 239/DIG. 19; 244/207; 310/311
(58) Field of Classification Search ............... 239/102.1, 239/102.2, 589, 601, 602, DIG. 19; 347/10, 347/68; 244/204.1, 207; 310/311
See application file for complete search history.

(56) References Cited

U.S. PATENT DOCUMENTS

| | | | |
|---|---|---|---|
| 4,465,234 A | 8/1984 | Maehara et al. | |
| 4,702,418 A | 10/1987 | Carter et al. | |
| 4,850,534 A | 7/1989 | Takahashi et al. | |
| 5,261,601 A | 11/1993 | Ross et al. | |
| 5,518,179 A | 5/1996 | Humberstone et al. | |
| 6,394,363 B1 | 5/2002 | Arnott et al. | |
| 6,588,497 B1* | 7/2003 | Glezer et al. | 239/102.2 |
| 6,722,581 B2 | 4/2004 | Saddoughi | |
| 7,066,398 B2 | 6/2006 | Borland et al. | |
| 7,988,103 B2* | 8/2011 | Land et al. | 244/207 |
| 8,052,069 B2 | 11/2011 | Xu et al. | |
| 2008/0043061 A1* | 2/2008 | Glezer et al. | 347/68 |
| 2008/0174620 A1* | 7/2008 | Tanner | 347/10 |

OTHER PUBLICATIONS

Tian-Bing Xu et al., "Advance High Performance Synthetic Jet Acturators (HIZMASS) for Active Flow Control in Supersonic Internal and External Viscous Flow" Technical Proposal, National Institute of Aerospace ROA 2006, Hampton, Jul. 7, 2006.
Tian-Bing Xu et al., "High Performance, Zero-Net Mass-Flux Actuators (HIZMASS) for Active Control of Viscous Separated Flow on Rotocraft Vehicles", Technical Proposal, National Institute of Aerospace ROA 2006, Hampton, Jul. 7, 2006.

* cited by examiner

*Primary Examiner* — Steven J Ganey
(74) *Attorney, Agent, or Firm* — Andrea Z. Warmbier; Linda B. Blackburn

(57) ABSTRACT

The present invention comprises a high performance, horizontal, zero-net mass-flux, synthetic jet actuator for active control of viscous, separated flow on subsonic and supersonic vehicles. The present invention is a horizontal piezoelectric hybrid zero-net mass-flux actuator, in which all the walls of the chamber are electrically controlled synergistically to reduce or enlarge the volume of the synthetic jet actuator chamber in three dimensions simultaneously and to reduce or enlarge the diameter of orifice of the synthetic jet actuator simultaneously with the reduction or enlargement of the volume of the chamber. The present invention is capable of installation in the wing surface as well as embedding in the wetted surfaces of a supersonic inlet. The jet velocity and mass flow rate for the SJA-H will be several times higher than conventional piezoelectric actuators.

10 Claims, 7 Drawing Sheets

Figure 1:
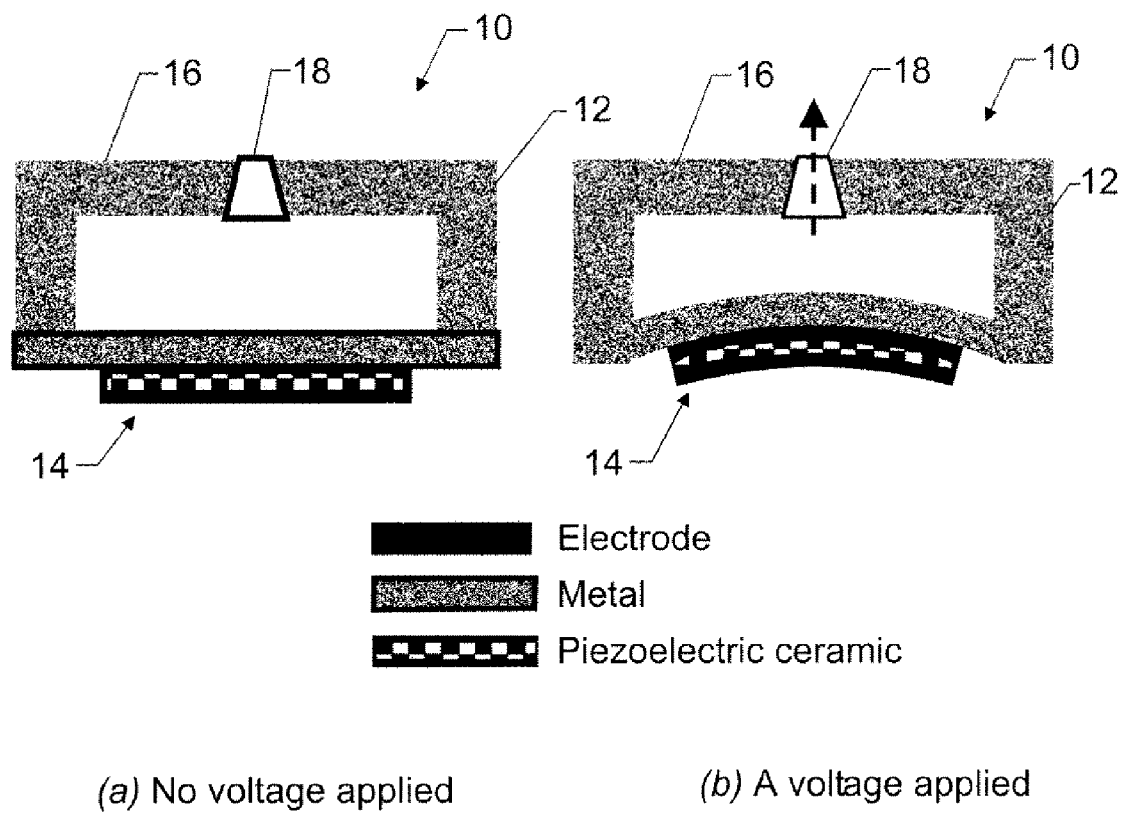

(a) No voltage applied  (b) A voltage applied (a) No voltage applied (b) A voltage applied (Known Art)

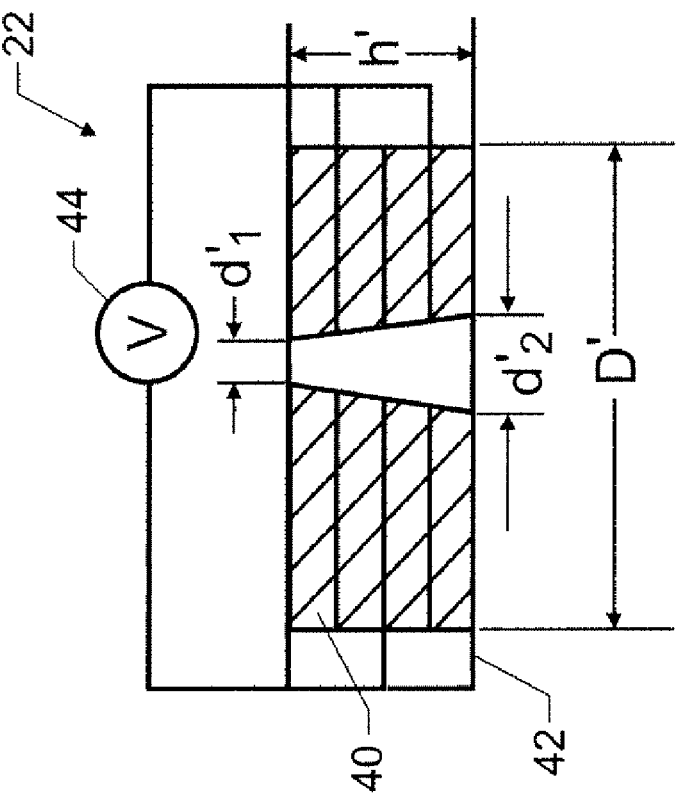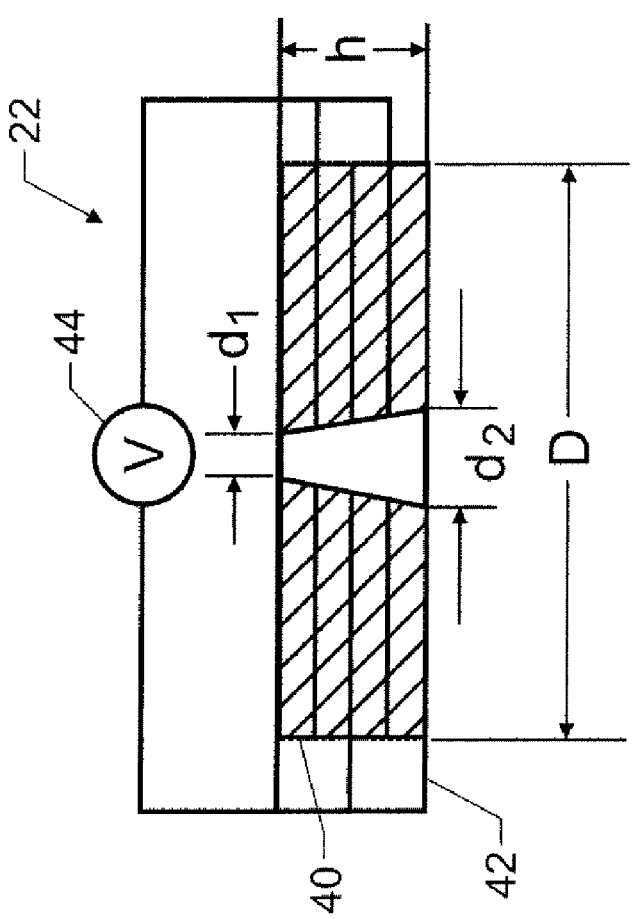
FIG. 4

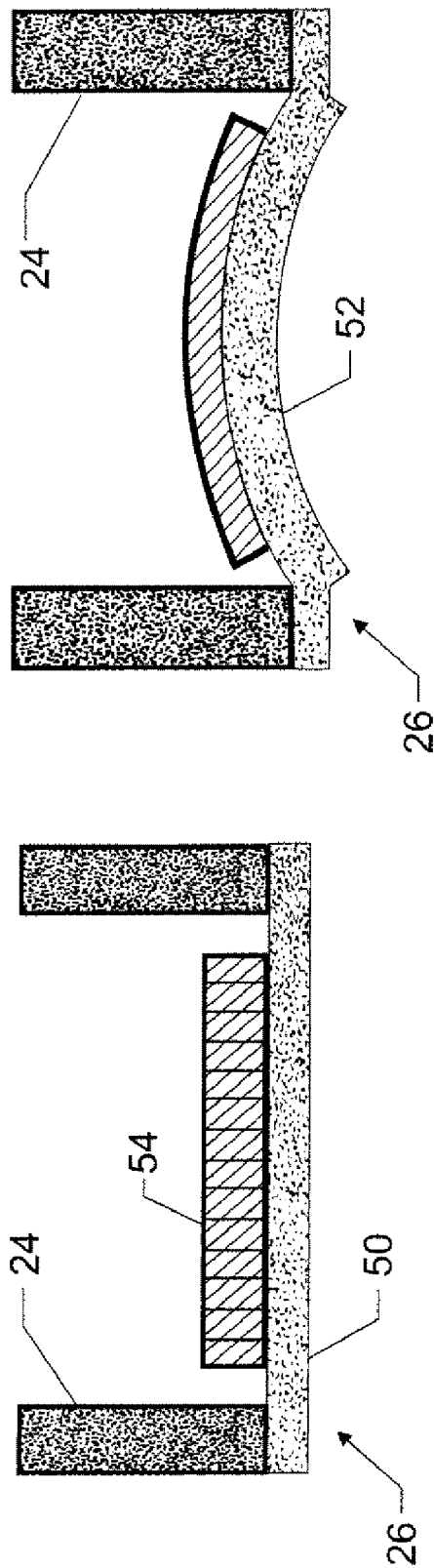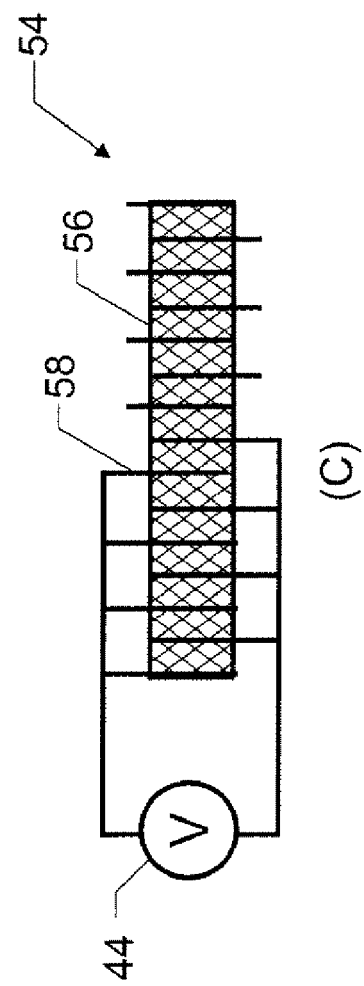
FIG. 7

ADVANCED HIGH PERFORMANCE HORIZONTAL PIEZOELECTRIC HYBRID SYNTHETIC JET ACTUATOR

ORIGIN OF THE INVENTION

The invention was made in part by an employee of the United States Government and may be manufactured and used by and for the Government of the United States for governmental purposes without the payment of any royalties thereon or therefore. Pursuant to 35 U.S.C. §119, the benefit of priority from provisional application 61/091.512, with a filing date of Aug. 25, 2008, is claimed for this non-provisional application.

FIELD OF THE INVENTION

The present invention relates generally to synthetic jet actuators and, more particularly, relates to synthetic jet actuators with multiple electroactive components.

BACKGROUND OF THE INVENTION

Active flow control changes the paradigm of aerodynamic design of current and future wing-borne systems in subsonic, transonic and supersonic flow. Active flow control should be an inherent input to the conceptual design of the next generation of commercial and military flight vehicles. Retrofitted to current fixed-wing aircraft, active flow control can "clean up" complex three-dimensional, external flow separations on the wing top surface particularly severe under maneuvering conditions. Active flow control can inhibit flow distortion at the compressor face in supersonic inlets emanating from shock/boundary-layer interactions on the inlet sidewalls, at the inlet throat, and in the subsonic diffuser. Active flow control makes feasible aerodynamic design for high lift/drag ratios at cruise and efficient subsonic/transonic performance at off-design conditions, taking into account environmental and performance constraints. The outcome is a reduction in overall drag of the vehicle, alleviation of unsteady loads and prevention of the expulsion of the inlet shock system (that may lead to catastrophic loss of the airframe).

It is known to use a synthetic jet (also termed a zero net mass flux jet) to influence the flow over a surface, for example to control flow separation from an airfoil. An isolated synthetic jet is produced by the interactions of a train of vortices that are typically formed by alternating momentary ejection and suction of fluid through an orifice of an actuator. A typical synthetic jet actuator (SJA) comprises a housing defining an internal chamber. An orifice is present in a wall of the housing. The actuator further includes a mechanism in or about the housing for periodically changing the volume within the internal chamber so that a series of fluid vortices are generated and projected in an external environment out from the orifice of the housing. Various volume changing mechanisms are known, for example a piston positioned in the jet housing to move so that fluid is moved in and out of the orifice during reciprocation of the piston, or a flexible diaphragm as a wall of the housing. The flexible diaphragm is typically actuated by a piezoelectric actuator or other appropriate means.

A conventional SJA configuration is shown in FIGS. 1(a) and 1(b). The conventional SJA 10 comprises a metal cylinder 12 with an active diaphragm 14 on the bottom, and a passive diaphragm 16 on the top. In the center of the top diaphragm is a circular inlet/outlet orifice 18. The active diaphragm comprises a unimorph that in turn comprises a thin strip of piezoelectric material (e.g., ceramic) bonded to a strip of metal (e.g., brass). Electrodes are positioned on either side of the strip of piezoelectric material in order to apply a voltage (the connections to the electrodes and the power source are not illustrated in FIG. 1).

When voltage is not applied to the active diaphragm, the active diaphragm is substantially flat as shown in FIG. 1(a). When a voltage is applied to the active diaphragm, the active diaphragm flexes upward as shown in FIG. 1(b). This upward flexing of the active diaphragm reduces the volume of the chamber and causes air to be jetted out (as illustrated by the dashed arrow). For the conventional SJA, a negative transverse strain mode is used in the diameter direction of the piezoelectric diaphragm. This limits the displacement of the bottom diaphragm for two reasons: (1) piezoelectric transverse strain in ceramics and single crystals is about half of its longitudinal strain; and (2) the negative transverse strain induces the ceramic component to shrink along its diameter direction, reducing the flexing displacement of the diaphragm.

In the past a few years, a number of computational fluid dynamics studies have indicated that SJAs have the potential to be used for active flow control in supersonic, hypersonic, and subsonic vehicles. A number of theoretical studies indicate that the synthetic jet actuator is one of the most efficient devices for flow control. According to these studies, the interaction of synthetic jets with an external cross flow over the surface on which they are mounted can displace the local streamlines and can induce an apparent or virtual change in the shape of the surface, thereby effecting flow changes on length scales that are one to two orders of magnitude larger than the characteristic scale of the jets. Global control of the aircraft will be enhanced, using this new-generation control structure. A number of experimental studies have demonstrated this effect, but they have shown that jet velocity is not high enough to be used at supersonic speeds. Unfortunately, the jet velocity and mass flow rate of currently existing SJAs are not high enough to meet the needs of active dynamic controls for space missions. In today's technological climate, there is a strong impetus to develop piezoelectric synthetic jet actuators with jet velocities of over 150 meters per second (m/s) at non-resonance working mode.

BRIEF SUMMARY OF THE INVENTION

The advanced high performance horizontal hybrid electroactive synthetic jet actuator (ASJA-H) is a synthetic jet actuator with three-dimensional active walls synergistically cooperating with each other, utilizing the positive and negative strains of the electroactive materials in different directions. The novel ASJA-H can provide active aerodynamic control for supersonic, hypersonic, and subsonic fixed wing aircraft and subsonic rotary wing aircraft.

In one embodiment of the invention, a synthetic jet actuator comprises a plurality of walls forming a chamber. One of the plurality of walls defines an orifice therethrough, and each of the plurality of walls comprises electroactive material. The plurality of walls may comprise an electroactive circular plate, an electroactive cylindrical wall, and an electroactive diaphragm. The electroactive circular plate and the electroactive diaphragm are joined to the electroactive cylindrical wall at opposing ends of the electroactive cylindrical wall such that the formed chamber has a closed cylinder shape. The electroactive circular plate defines the orifice therethrough. The orifice may have a generally frustoconical shape.

The electroactive circular plate and the electroactive cylindrical wall may comprise multiple layers of electroactive material. The electroactive diaphragm may comprise a layer of electroactive material bonded to a layer of metal, and the electroactive material layer may comprise multiple concentric cylinders of electroactive material.

The electroactive diaphragm may be sized such that at least the electroactive material layer fits within the electroactive cylindrical wall. In such an embodiment, a flexible sealer may be disposed between the electroactive material layer and the electroactive cylindrical wall.

The positive strain and negative strain of the electroactive circular plate are configured such that, when voltage is applied to the electroactive circular plate, (i) a height of the electroactive circular plate increases, (ii) a diameter of the electroactive circular plate decreases, and (iii) a diameter of the orifice decreases.

The positive strain and negative strain of the electroactive cylindrical wall are configured such that, when voltage is applied to the electroactive cylindrical wall, (i) a height of the electroactive cylindrical wall decreases, (ii) a thickness of the electroactive cylindrical wall increases, and (iii) an inner diameter of the electroactive cylindrical wall decreases.

The positive strain and negative strain of the electroactive diaphragm are configured such that, when voltage is applied to the electroactive diaphragm, a diameter of the electroactive diaphragm increases, thereby causing a center of the electroactive diaphragm to flex toward the electroactive circular plate.

BRIEF DESCRIPTION OF THE SEVERAL VIEWS OF THE DRAWING(S)

Figure 2:
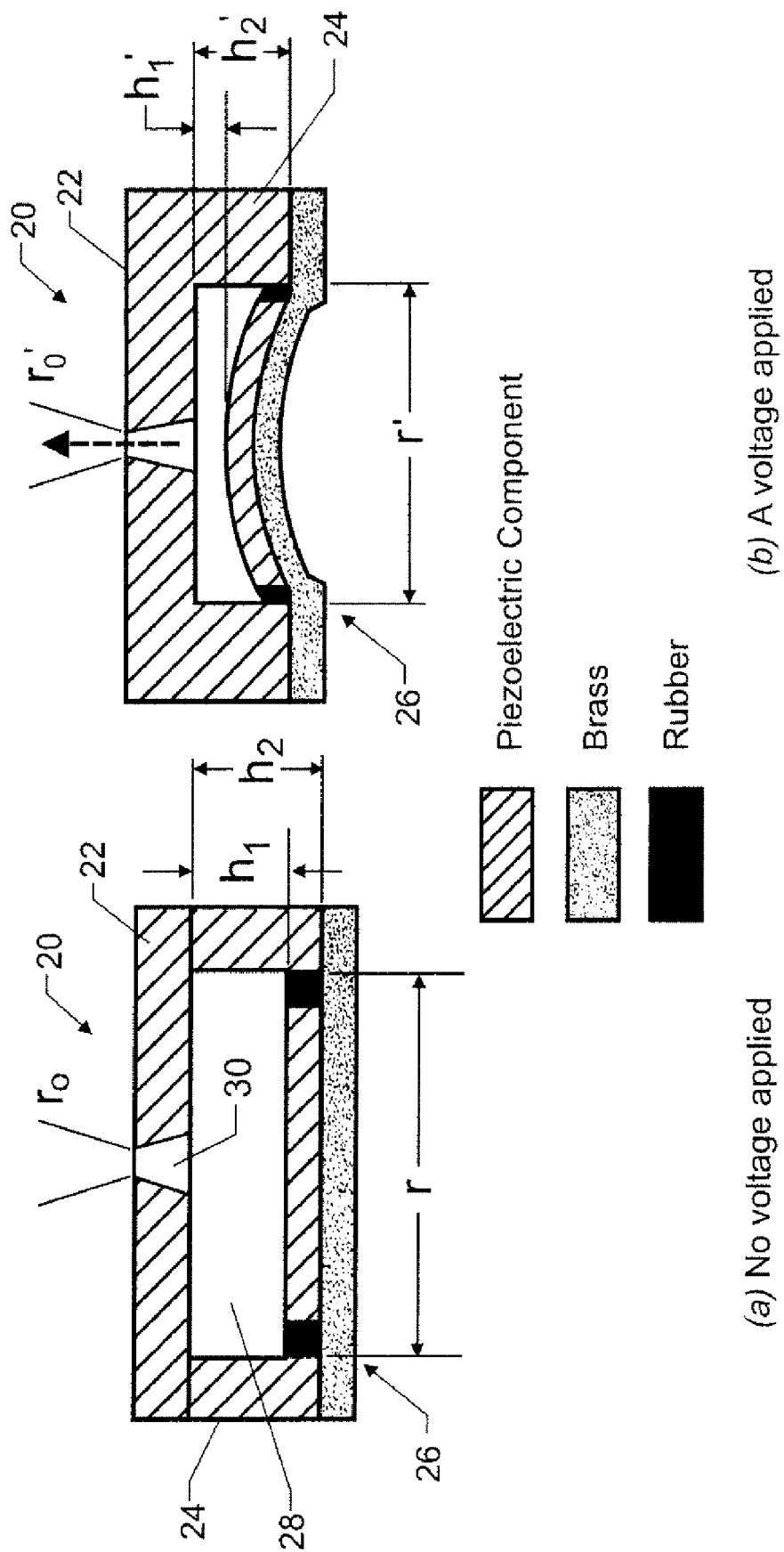
Figure 3:
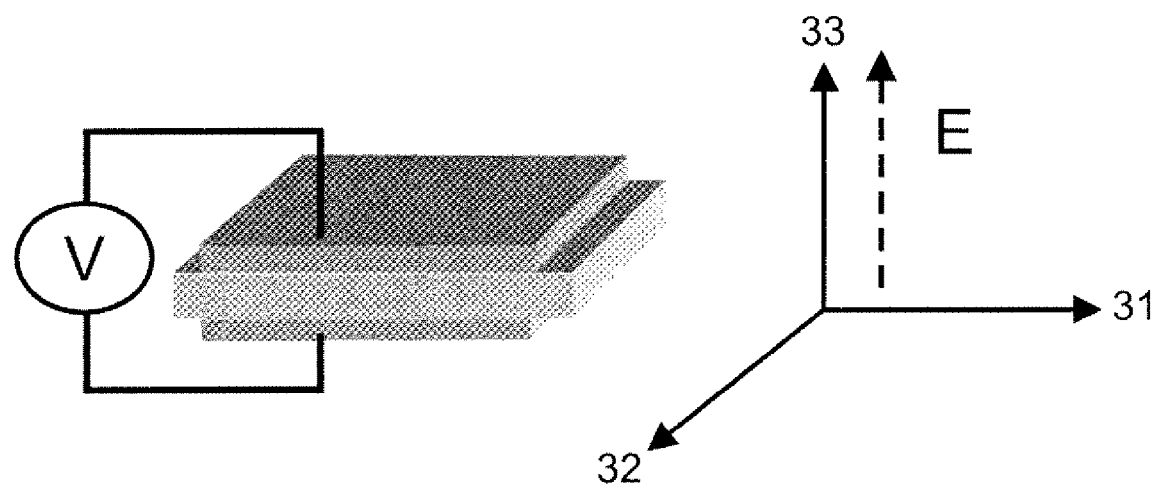
Figure 6:
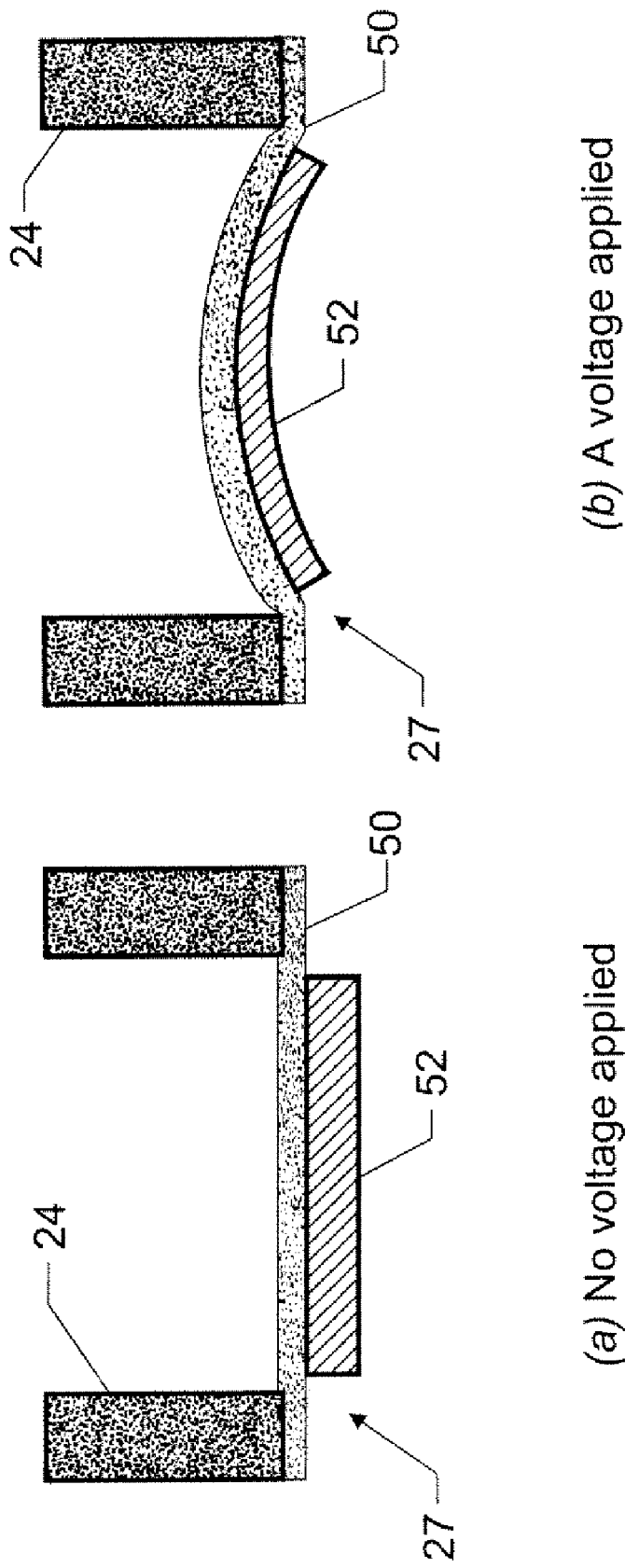

Having thus described the invention in general terms, reference will now be made to the accompanying drawings, which are not necessarily drawn to scale, and wherein:

FIGS. 1(a) and (b) are simplified cross-sectional schematic views of a conventional synthetic jet actuator;

FIGS. 2(a) and (b) are simplified cross-sectional schematic views of an advanced high performance horizontal hybrid electroactive synthetic jet actuator (ASJA-H), in accordance with embodiments of the present invention;

FIG. 3 illustrates the characteristics of electro-mechanical response in electroactive materials;

FIGS. 4(a) and (b) are more detailed cross-sectional schematic views of the electroactive circular plate of the ASJA-H of FIG. 2;

FIGS. 5(a) and (b) are more detailed cross-sectional schematic views of the cylindrical wall of the ASJA-H of FIG. 2;

FIGS. 6(a) and (b) are more detailed cross-sectional schematic views of the electroactive diaphragm of the ASJA-H of FIG. 2 in accordance with one embodiment of the invention; and FIGS. 7(a), (b), and (c) are more detailed cross-sectional schematic views of the electroactive diaphragm of the ASJA-H of FIG. 2 in accordance with an alternate embodiment of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Synthetic jet actuators of embodiments of the invention comprise a plurality of walls forming a chamber, where each of the plurality of walls comprises electroactive material. By having all of the walls comprise electroactive material, upon application of a voltage to all of the walls the size of the chamber is reduced in all three dimensions. This three-dimensional reduction in the size of the chamber causes a much greater reduction of reservoir volume as compared to conventional SJA Embodiments of the invention will be described herein in which the synthetic jet actuators of embodiments of the invention have generally a closed cylinder shape (with the walls forming a chamber and at least one wall defining an orifice). However, other embodiments of the invention may have other shapes, including but not limited to a cuboid or a cube (again, with the walls forming a chamber and at least one wall defining an orifice).

Referring now to FIGS. 2(a) and (b), simplified cross-sectional schematic views of an advanced high performance horizontal hybrid electroactive synthetic jet actuator (ASJA-H) 20 is illustrated in accordance with embodiments of the present invention. FIG. 2(a) illustrates the ASJA-H when no voltage is applied, and FIG. 2(b) illustrates the ASJA-H when a voltage is applied. The ASJA-H of FIGS. 2(a) and (b) comprises a generally cylindrical device with three electroactive components—a multilayer electroactive circular plate 22 that forms the top end wall of the cylinder, a center electroactive multilayer cylinder 24 that forms the side wall of the cylinder, and an edge clamped electroactive multilayer metal unimorph diaphragm 26 that forms the bottom end wall of the cylinder. (The terms top, center and bottom are used for descriptive purposes and are not intended to limit the orientation of the device during use. Embodiments of the invention may in fact be positioned during use in any desired orientation.)

As seen in FIGS. 2(a) and (b), the electroactive circular plate 22 and the electroactive diaphragm 26 are Joined to the electroactive cylindrical wall 24 at opposing ends of the electroactive cylindrical wall to form a closed cylinder shape that defines a chamber or reservoir 28. The electroactive circular plate 22 defines an orifice 30 therethrough. The orifice typically has a generally frustoconical shape (such that the top and bottom openings are circular), or frustopyramidal shape (such that the top and bottom openings are square), or may have an elongated shape (i.e., a slot). The electroactive components are constructed of, for example, piezoelectric material such as ceramic or crystal. The electroactive components will be described in further detail below. As discussed below, FIGS. 2(a) and (b) illustrate one of the alternate diaphragm configurations.

The deformations of the three electroactive walls of the ASJA-H are hybrid in order to obtain maximum changes of the jet reservoir volume and the diameter of the jet orifice. For each cycle, the change of reservoir volume of the ASJA-H is three to five times greater than that of a conventional SJA (which has only one electroactive component—a negative strain-based bottom piezoelectric diaphragm). This much greater reservoir volume change provided by the novel structure of the present invention improves the mass flow rate so that it is many times greater than that of a conventional SJA. Simultaneously, the reduction of the orifice (inlet/outlet) diameter produces a higher jet velocity when the volume of the reservoir is actively reduced. The ASJA-H concept has a much higher performance than the conventional SJA because of the three-dimensional active motion of the device walls.

The ASJA-H is thin enough to install into the surfaces of rotorcraft blades or airfoils of a fixed wing aircraft. This technology enables the industry to make the new helicopters safer and the other aircraft more reliable.

In order to optimize the design of the present ASJA-H, it is desirable to first study the characteristics of the electromechanical response in electroactive ceramics/single crystals first as illustrated in FIG. 3. For a piezoelectric material 30 (which, as illustrated in FIG. 3, is bonded to conductors on opposing sides to enable a voltage to be applied to the material), the electric field direction is depicted by the dashed arrow labeled "E." The electric field induces a strain in direction 33 that is parallel to the electric field direction, and this strain is termed a longitudinal strain and is referred to as $S_{33}$. The electric field also induces strains in the two directions 31, 32 that are perpendicular to the electrical field directions, and these strains are termed called transverse strains and are referred to as $S_{31}$ and $S_{32}$. For inorganic piezoelectric materials, such as ceramics or single crystals, the longitudinal strains are positive and the transverse strains are negative. Normally, $S_{33} \approx -2S_{31} \approx -2S_{32}$. With different multilayer configurations, one can obtain a special component which can offer either positive or negative strain in a certain direction to form a hybrid actuation system.

Referring now to FIGS. 4(a) and (b), more detailed cross-sectional schematic views of the electroactive circular plate 22 are illustrated. FIG. 4(a) illustrates the electroactive circular plate when no voltage is applied, and FIG. 4(b) illustrates the electroactive circular plate when a voltage is applied. The electroactive circular plate is multilayer, in that multiple layers 40 of electroactive material are stacked and bonded together to form the electroactive circular plate. The electroactive circular plate 22 is illustrated in FIG. 4 with four layers of electroactive material, but a larger or smaller number of layers may be used as desired. Both opposing flat sides of each layer contacts an electrical conductor layer 42. Two of the conductors (the topmost conductor and the bottommost conductor) contact only one electroactive layer, while the remaining conductors are positioned between electroactive layers and therefore contact the two electroactive layers between which the conductor lies. Each conductor is electrically connected to a voltage source 44 (alternating ones of the conductors are electrically connected to the positive terminal of the voltage source 44 or to the negative terminal of the voltage source). As mentioned above, a frustoconical orifice is defined at the center of the electroactive circular plate. The positive strain and negative strain of the electroactive circular plate are configured such that, when a voltage is applied across the electroactive circular plate along its longitudinal direction, the height of the electroactive circular plate increases from h to h', the diameter of the electroactive circular plate decreases from D to D' and the diameter of the orifice decreases (the top opening of the orifice decreases from $d_1$ to $d_1$' and the bottom opening of the orifice decreases from $d_2$ to $d_2$'). The advantages of the multilayer sandwich are to reduce the applied voltage requirement, achieve high deformation of the electroactive circular plate, and keep high blocking force (load capability).

Figure 5:
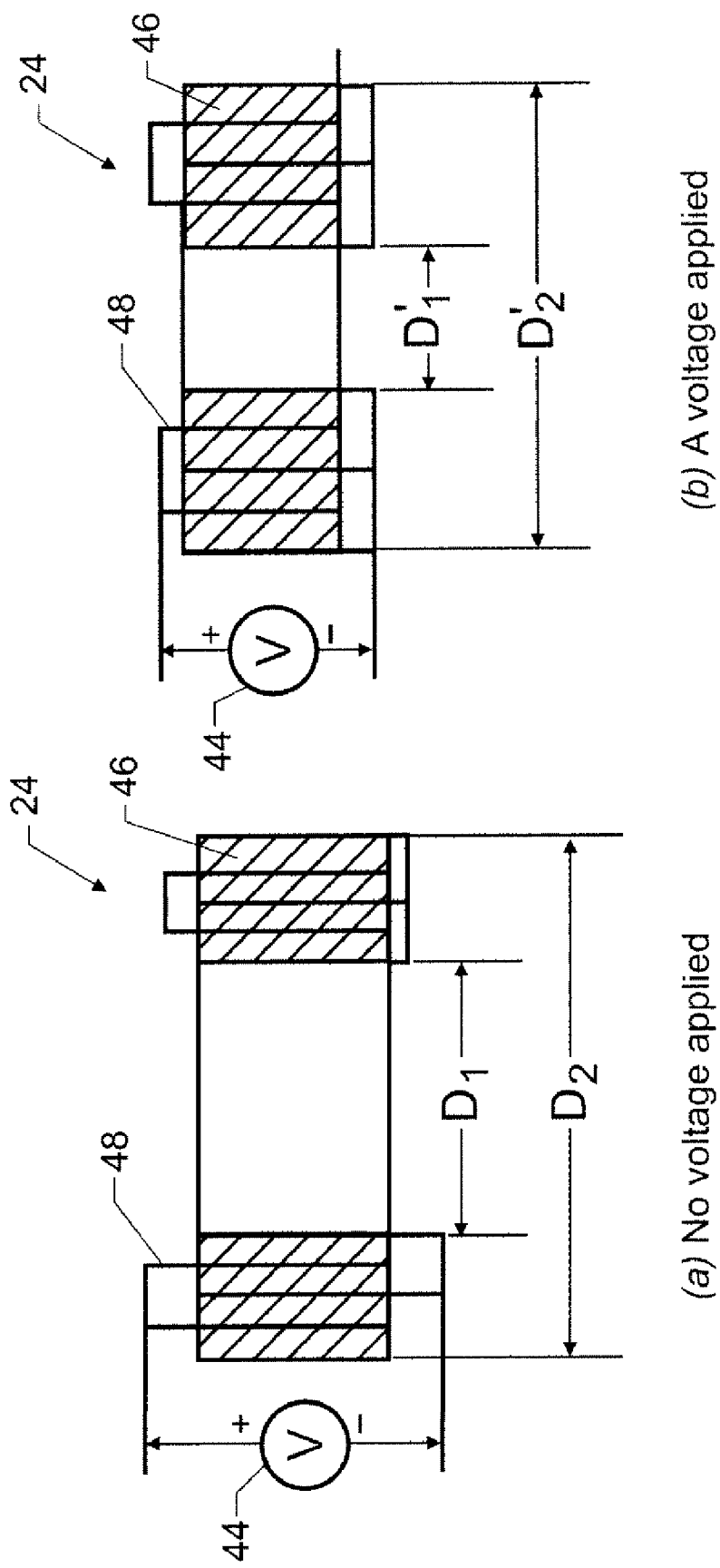

Referring now to FIGS. 5(a) and (b), more detailed cross-sectional schematic views of the center electroactive cylindrical wall 24 are illustrated. FIG. 5(a) illustrates the center cylindrical wall when no voltage is applied, and FIG. 5(b) illustrates the center cylindrical wall when a voltage is applied. The center cylindrical wall is an electroactive multilayer cylinder, in that multiple concentric (nested) layers 46 of electroactive material are bonded together to form the cylinder. The center cylindrical wall 24 is illustrated in FIG. 5 with four concentric layers of electroactive material, but a larger or smaller number of layers may be used as desired. Each opposing inner and outer side of each layer contacts an electrical conductor layer 46. Two of the conductors (the outermost conductor and the innermost conductor) contact only on electroactive layer, while the remaining conductors are positioned between electroactive layers and therefore contact the two electroactive layers between which the conductor lies. Each conductor is electrically connected to a voltage source 44 (alternating ones of the conductors are electrically connected to the positive terminal of the voltage source 44 or to the negative terminal of the voltage source). The positive strain and negative strain of the center cylindrical wall are configured such that, when a voltage is applied across the wall (i.e., perpendicular to the longitudinal axis), the thickness $((D_2-D_1)/2)$ of the cylinder wall increases, the height of the cylinder decreases, the inner diameter decreases from $D_1$ to $D_1$' and the outer diameter decreases from $D_2$ to $D_2$'.

The electroactive diaphragm can be either a negative transverse strain based diaphragm (substantially the same as the diaphragm in the conventional SJA of FIG. 1), as shown in FIGS. 6(a) and (b), or a multilayer electroactive cylinder based ceramic-metal unimorph diaphragm as shown in FIGS. 7(a)-(c). Even for the conventional negative transverse strain based diaphragm, the flexing will be also greater that a same diaphragm in a conventional ASJ when a same voltage is applied since the decreasing diameter of the cylinder chamber increases the flexing motion of the diaphragm.

Referring not to FIGS. 6(a) and (b), more detailed cross-sectional schematic views of the conventional electroactive diaphragm are illustrated. FIG. 6(a) illustrates the electroactive diaphragm when no voltage is applied, and FIG. 6(b) illustrates the electroactive diaphragm when a voltage is applied. The diaphragm 27 of FIGS. 6(a) and (b) comprises a metal plate 50 and an electroactive layer 52 bonded to the bottom side (i.e., the side opposite the chamber) of the metal plate. For clarity, the conductors on opposing sides of the electroactive layer are not illustrated. When a voltage is applied along its diameter direction, the diameter of the electroactive layer decreases. This decrease in diameter makes the entire diaphragm flex upward into a curved shape as shown in FIG. 6(b). The diameter of the electroactive layer is smaller than the inner diameter of the cylinder to enable the diaphragm to flex.

Referring now to FIGS. 7(a), (b), and (c), more detailed cross-sectional schematic views of the multilayer electroactive diaphragm are illustrated. FIG. 7(a) illustrates the electroactive diaphragm when no voltage is applied, and FIG. 7(b) illustrates the electroactive diaphragm when a voltage is applied. The diaphragm 26 of FIGS. 7(a) and (b) comprises a metal plate 50 and a multilayer electroactive layer 54 bonded to the top side (i.e., the side toward the chamber) of the metal plate. For clarity, the conductors between the multiple layers are not illustrated in FIGS. 7(a) and (b). When a voltage is applied along its diameter direction, the diameter of the electroactive layer increases. This increase in diameter makes the entire diaphragm flex upward into a curved shape as shown in FIG. 7(b). Since the longitudinal strain is two times larger than the transverse strain for the same electric field, the flexing displacement is $2^{0.5}$ times the flexing displacement of the conventional horizontal ASJA, shown in FIG. 1(b).

The multilayer electroactive layer 54 is formed with a plurality of concentric (nested), thin, short cylinders 56. Any desired number of layers or cylinders may be used. As illustrated in FIG. 7(c), each opposing inner and outer side of each layer 56 contacts an electrical conductor layer 58. Two of the conductors (the outermost conductor and the innermost conductor) contact only one electroactive layer, while the remaining conductors are positioned between electroactive layers and therefore contact the two electroactive layers between which the conductor lies. Each conductor is electrically connected to a voltage source 44 (alternating ones of the conductors are electrically connected to the positive terminal of the voltage source 44 or to the negative terminal of the voltage source). The diameter of the electroactive layer is smaller than the inner diameter of the cylinder to enable the diaphragm to flex. Unlike the embodiment of FIG. 6, in the embodiment of FIG. 7 the electroactive layer is positioned within the cylinder wall 24. In order to allow the bottom diaphragm freedom to flex and to reduce the reservoir volume, a flexible sealer (e.g., rubber) (illustrated in FIG. 2 but not in FIG. 7) is used to fill the space between the inner wall of the cylinder 24 and the electroactive layer 54 of the diaphragm.

The ASJA-H of embodiments of the invention can be used in broad areas of dynamic control. Each aircraft needs several dozen of this kind of device for local aerodynamic control. In addition, underwater facilities also need this kind of device for control and detection.

In one exemplary embodiment, an ASJA-H is constructed having physical dimensions as indicated in Table 1.

TABLE 1

| Components | Dimension | Value (mm) |
|---|---|---|
| Top piezoelectric multilayer diaphragm | Diameter | 60 |
| | Total thickness | 30 |
| | Thickness of single layer | 0.5 |
| Orifice of top diaphragm | Upper diameter | 1.0 |
| | Lower diameter | 2.0 |
| Piezoelectric multilayer cylinder | Internal diameter | 50 |
| | External diameter | 60 |
| | Height | 6 |
| Piezoelectric diaphragm of bottom unimorph | Diameter | 46 |
| | Thickness | 20 |
| | Thickness of a single cylinder layer | 0.5 |
| Brass diaphragm of bottom unimorph | Diameter | 60 |
| | Thickness | 0.1 |

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A synthetic jet actuator comprising:
   a plurality of walls forming a chamber, one of the plurality of walls defining an orifice therethrough, each of the plurality of walls comprising electroactive material,
   wherein the plurality of walls further comprise:
   an electroactive circular plate;
   an electroactive cylindrical wall; and
   an electroactive diaphragm;
   wherein the electroactive circular plate and the electroactive diaphragm are joined to the electroactive cylindrical wall at opposing ends of the electroactive cylindrical wall such that the formed chamber has a closed cylinder shape; and wherein the electroactive circular plate defines the orifice therethrough.

2. The synthetic jet actuator of claim 1, wherein the electroactive circular plate and the electroactive cylindrical wall comprise multiple layers of electroactive material.

3. The synthetic jet actuator of claim 1, wherein the electroactive diaphragm comprises a layer of electroactive material bonded to a layer of metal.

4. The synthetic jet actuator of claim 3, wherein the electroactive material layer comprises multiple concentric cylinders of electroactive material.

5. The synthetic jet actuator of claim 3, wherein the electroactive diaphragm is sized such that at least the electroactive material layer fits within the electroactive cylindrical wall.

6. The synthetic jet actuator of claim 5, wherein a flexible scaler is disposed between the electroactive material layer and the electroactive cylindrical wall.

7. The synthetic jet actuator of claim 1, wherein a positive strain and a negative strain of the electroactive circular plate are configured such that, when voltage is applied to the electroactive circular plate, (i) a height of the electroactive circular plate increases, (ii) a diameter of the electroactive circular plate decreases, and (iii) a diameter of the orifice decreases.

8. The synthetic jet actuator of claim 1, wherein a positive strain and a negative strain of the electroactive cylindrical wall are configured such that, when voltage is applied to the electroactive cylindrical wall, (i) a height of the electroactive cylindrical wall decreases, (ii) a thickness of the electroactive cylindrical wall increases, and (iii) an inner diameter of the electroactive cylindrical wall decreases.

9. The synthetic jet actuator of claim 1, wherein a positive strain and a negative strain of the electroactive diaphragm are configured such that, when voltage is applied to the electroactive diaphragm, a diameter of the electroactive diaphragm increases, thereby causing a center of the electroactive diaphragm to flex toward the electroactive circular plate.

10. The synthetic jet actuator of claim 1, wherein the orifice has a generally frustoconical shape.

* * * * *